United States Patent [19]

Sung

[11] Patent Number: 4,844,117
[45] Date of Patent: Jul. 4, 1989

[54] FLUID LEVEL CONTROLLER

[75] Inventor: Ken Sung, San Diego, Calif.

[73] Assignee: NCR Corporation, Dayton, Ohio

[21] Appl. No.: 293,166

[22] Filed: Jan. 2, 1989

[51] Int. Cl.$^4$ .............................................. F16K 31/68
[52] U.S. Cl. ..................................... 137/386; 60/527;
60/528; 62/49.2; 73/295; 236/68 B; 251/11
[58] Field of Search ............... 60/527, 528; 236/68 B,
236/101 E, 101 R; 62/49, 55; 73/295; 251/11;
137/386, 392

[56] References Cited

U.S. PATENT DOCUMENTS

| | | | |
|---|---|---|---|
| 1,824,988 | 9/1931 | French et al. | 73/295 |
| 2,214,272 | 9/1940 | Dillman | 251/11 |
| 2,570,451 | 10/1951 | Hottenroth | 236/68 B |
| 2,572,582 | 10/1951 | Andrews | 236/68 B |
| 2,761,924 | 9/1956 | Keenan | 73/295 |
| 2,978,691 | 4/1961 | Beher | 340/622 |
| 3,031,887 | 5/1902 | Wiesend | 73/295 |
| 3,049,887 | 8/1962 | Sharp et al. | 62/55 |
| 3,085,433 | 4/1963 | Shmueli | 73/295 |
| 3,138,023 | 6/1964 | Washbuck | 73/295 |
| 3,173,245 | 3/1965 | Schutmatt | 251/11 |
| 3,205,709 | 9/1965 | Gearing et al. | 73/295 |
| 3,216,209 | 11/1965 | Krigsman | 62/55 |
| 3,298,658 | 1/1967 | Alyea | 251/11 |
| 3,433,248 | 3/1969 | Hedstrom | 62/49 |
| 3,500,634 | 3/1970 | Waseleski, Jr. et al. | 251/11 |
| 3,540,479 | 11/1970 | Thompson | 251/11 |
| 3,562,546 | 2/1971 | Kraemer | 73/295 |
| 3,587,244 | 6/1971 | Wood | 62/126 |
| 3,860,169 | 1/1975 | Norman | 251/11 |
| 3,935,738 | 2/1976 | Bemham | 73/295 |
| 4,307,606 | 12/1981 | Johnson | 73/295 |
| 4,313,102 | 1/1982 | Broetto | 340/59 |
| 4,385,519 | 5/1983 | Tokarz | 73/295 |

Primary Examiner—George L. Walton
Attorney, Agent, or Firm—Wilbert Hawk, Jr.; Stephen F. Jewett

[57] ABSTRACT

A fluid level controller having a thermal expansion element in the form of cylinder made from polytetrafluoroethylene. The cylinder is located in a container which is connected to a supply of cryogenic fluid by a ball valve. When the cryogenic fluid in the container reaches the level of the cylinder and cools it, the cylinder shrinks and causes a lever to close the ball valve. When the cryogenic fluid falls below the level of the cylinder, the cylinder expands and the lever opens the ball valve and permits cryogenic fluid to flow through the valve and into the container. The cylinder has a heating element disposed in its interior to hasten the response of the cylinder to a change in the fluid level.

12 Claims, 2 Drawing Sheets

FLUID LEVEL CONTROLLER

BACKGROUND OF THE INVENTION

The present invention relates to fluid level controllers and, more particularly, to such a controller for use in a container that cryogenically cools an electronic device.

Certain electronic devices, such as CMOS (complementary-metal-oxide semiconductor) integrated circuit (IC) chips, have been found to operate at significantly greater speeds when cooled to very low temperatures, for example −140° F. The use of cryogenic methods for cooling electronic devices has thus been proposed for (and in some cases commercially used in) computer systems.

In a typical cryogenic system for cooling an electronic device, the device is placed in a container having a cryogenic fluid, such as liquid nitrogen. Heat from the electronic device is absorbed by the fluid, and resulting vapors are vented from the container. It therefore become necessary to frequently replenish the cryogenic fluid in the container. As part of the replenishment, there must be provided a mechanism to control the level of fluid in the container in order to assure that a proper amount of cryogenic fluid will be available at all times to cool the electronic device.

Fluid level controllers are known in the art, but they are not well suited for the type of cryogenic containers used for cooling electronic devices. For example, a cryogenic container holding an electronic device usually has rather small dimensions, requiring that the level controller likewise be small. Prior level controllers for containers having cryogenic fluids have tended to be large (sometimes even mounted outside of the container) since they are designed for large tanks rather the small container that would typically be found in a computer system.

Some prior controllers operate from the pressure within the container. For example, a sensor tube may extend into the container and the controller senses a change in pressure in the tube when the tube is closed as a result of the fluid rising from a level below the opening of the tube to a level above the opening of the tube. The problem with such a controller is that the pumping of the cryogenic fluid into the container from a supply tank often requires that the supply tank be at a significantly greater pressure than the container. Requiring also that the container have a sufficiently high pressure in order to use a sensor tube to control its fluid level (since the space above the fluid needs to be at a relatively high pressure in order to be sensed by the sensor tube) increases the amount of pressure needed to pump the fluid from the supply tank into the container and adds to the complexity and cost of the system.

There has thus arisen the need for a fluid level controller that occupies minimal space, that can be placed in a container containing cryogenic fluid for cooling an electronic device, and that is simple in design and inexpensive to manufacture.

SUMMARY OF THE INVENTION

There is provided, in accordance with the present invention, a fluid level controller for a cryogenic container, the controller comprising a valve for controlling the flow of fluid into the container and a thermal expansion member which has a relatively high coefficient of thermal expansion. The valve has an open position and a closed position, with the thermal expansion member causing the valve to move from the open position to the closed position when the cryogenic fluid in the container comes into contact with the thermal expansion member, and causing the valve to move from the closed position to the open position when the cryogenic fluid goes out of contact with the thermal member.

In the described embodiment, the fluid level controller is used for cooling an IC chip. The thermal expansion member is a cylinder made from polytetrafluoroethylene (sold under the trademark TEFLON), with the heating element disposed in the cylinder to hasten the expansion of the cylinder when it is out of contact with the cryogenic fluid. A valve actuating member or means, in the form of a lever, operates the valve between its open and closed positions in response to the expansion and contraction of the cylinder.

It is therefore an object of the present invention to provide a new and improved fluid level controller.

It is another object of the present invention to provide such a fluid level controller for a cryogenic container used in cooling an IC chip.

It is yet another object of the present invention to provide a fluid level controller for a cryogenic container that operates other than by sensing the pressure in the cryogenic container.

It is still a further object of the present invention to provide a cryogenic fluid level controller that is small, simple in construction, and inexpensive to manufacture.

These and other objects, features, and advantages of the present invention will become apparent from the following description and the attached drawings.

DETAILED DESCRIPTION OF THE PREFERRED EMBODIMENT

Figure 1:
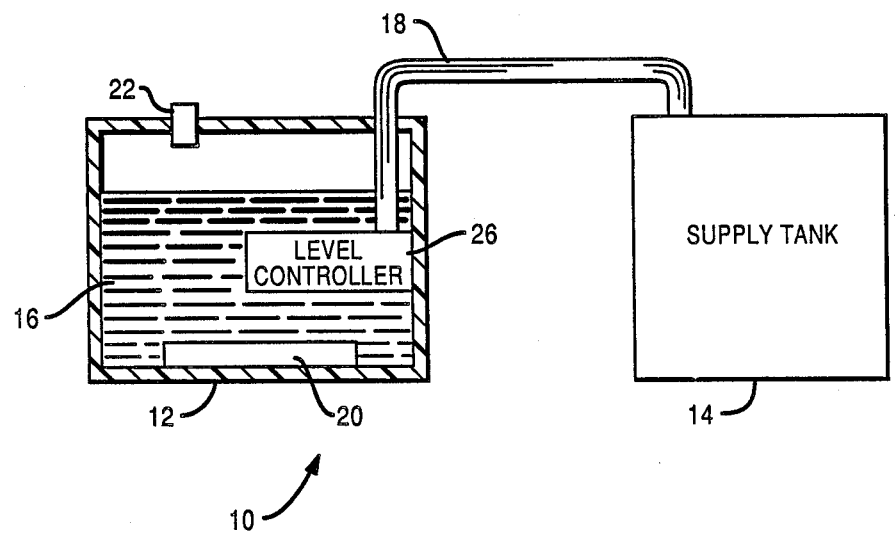
FIG. 1 is a partially sectioned and simplified schematic diagram of a cryogenic container and its associated supply tank, the cryogenic container cooling a electronic device and having a fluid level controller in accordance with the present invention.

Referring now to FIG. 1, there is seen a cooling system 10 having a cryogenic container 12 and a supply tank 14. The container 12 is supplied with cryogenic cooling fluid 16, such as liquid nitrogen, from the supply tank 14 by way of a supply line 18. An electronic device, such as an IC chip 20, is housed in the container 12 and submerged in the cryogenic fluid in order to maintain the IC chip at a very low temperature.

As heat is removed from the IC chip in order to maintain it at the desired low temperature, vapors from the cooling fluid are formed within the container 12 and are released from the container through a vent 22. In order to maintain cryogenic fluid in the container 12 at a sufficient level, a level controller 26 is provided. The controller 26 controls the amount of fluid that is provided by the supply line 18 from tank 14. Because of the continuous evaporation of the cooling fluid 16 during the cooling of the IC chip 20, the controller 26 dynamically and continually controls the level of the cooling fluid, in a manner that will described below.

Figure 2:
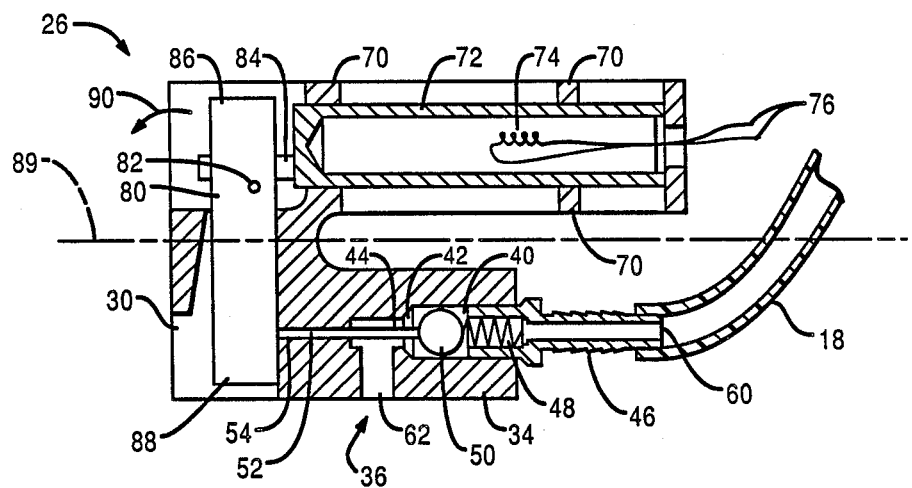
FIG. 2 is a transverse sectional view of the fluid level controller seen in FIG. 1, illustrating the valve of the controller in an open position.

FIG. 2 shows the fluid level controller 26 in greater detail. The controller includes an aluminum frame 30 having a base that forms the body 34 of a ball valve 36. The body of valve 36 has a horizontal bore forming a large diameter chamber 40, a valve seat 42 and a smaller diameter chamber 44. A barbed brass connector 46 is inserted into one end of the large diameter chamber 40, with a spring 48 trapped in the central bore of the connector 46 so as to urge or bias a valve ball 50 into sealing relationship with the valve seat 42. A valve stem or pin 52 is supported for sliding movement within a bore 54 that is coaxial with the chambers 40 and 44 and formed in the valve body at the end opposite the barbed connector 46.

One end of the barbed connector 46 is connected to the line 18 from the supply tank 14 (FIG. 1) with the barbs on the connector 46 securing the line 18. That end of the connector 46 serves as a valve inlet 60 of the valve 36. A valve outlet 62 is formed in the valve body 34, communicating with the small diameter chamber 44. The valve outlet 62 also serves as the inlet to the container 12 for cryogenic fluid provided to the container 12 through the valve 36 from the supply tank 14.

The upper portion of the frame 30 has two collars 70 formed therein for loosely supporting a thermal expansion member or cylinder 72. The interior of the cylinder 72 has a heating element 74, which is connected to a suitable source of electrical energy by a pair of wires 76. The cylinder 72 is designed to be submerged in the cryogenic fluid 16 (FIG. 1) and thus it is sealed to prevent the fluid 16 from entering the interior of the cylinder and making direct contact with the heating element 74.

A lever 80 is pivotally supported on the frame 30 by a pin 82. The lever 80 has a perpendicular extension 84 near one end 86 of the lever. For reasons which will become apparent, the pin 82 is positioned close to the end 86 of the lever (the end nearest the extension 84 and the cylinder 72) so that a relatively small lateral movement of the lever 80 at the end 86 will result in a much greater (and opposite) lateral movement of the lever at its opposite end 88.

The operation of the controller 26 will now be described with reference to FIGS. 2 and 3. In FIG. 2, the controller is illustrated in the condition where the cylinder 72 is above the level (represented by the line 89) of the cryogenic fluid 16 and the valve 36 is open to permit the flow of fluid from the supply line 18 into the container 12. In such condition, the heating element 74 heats the cylinder 72 and the cylinder expands. The longitudinal expansion of the cylinder 72 causes the end of the cylinder 72 closest to the lever 80 to move to the left, as viewed in FIG. 2, causing the lever 80 to pivot counterclockwise in the direction of arrow 90. The action of the lever 80 causes the pin 52 to move ball valve 50 away from the valve seat 42, thereby opening the valve 36 and permitting cryogenic fluid to enter the container 12. The loose fit of the cylinder 72 in the collars 70 permits the expansion of the cylinder without undue circumferential stresses on the cylinder.

Figure 3:
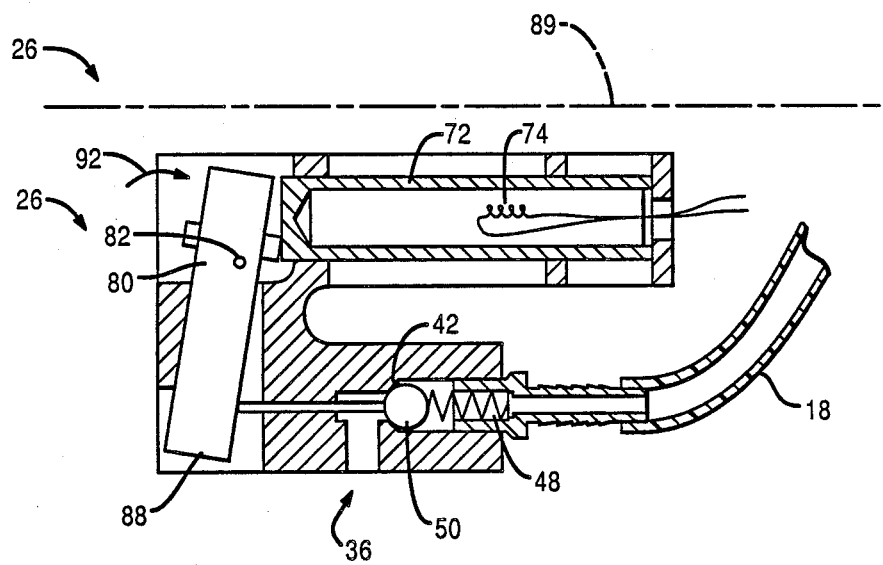
FIG. 3 is the same view as FIG. 2, but showing the valve in a closed position.

As cryogenic fluid enters the container 12, the fluid rises to the level illustrated by the line 89 in FIG. 3, where the cylinder 72 is submerged in the fluid. The cylinder 72 is cooled by the cryogenic fluid and contracts. The lever 80 pivots clockwise in the direction of arrow 92 (under the influence of the spring 48), permitting the valve ball 50 to move to the left and rest against the valve seat 42. the valve 36 is thus closed and the flow of fluid from the supply line 18 into the container stops.

The heating element 74 contributes to the responsiveness of the controller 26 to changes in the level of the cryogenic fluid. When the level of the fluid is below the cylinder 72, the heating element quickly heats the cylinder 72 and increases the amount of expansion of the cylinder. The very low temperature of the fluid, however, quickly dissipates the heat generated by the heating element 74 when the level of the fluid rises to the cylinder.

It should be noted that although the operation of the controller 26 has been described as involving two separate conditions, i.e., the first condition when the fluid level is below the cylinder 72 and the second condition when the fluid level is above the cylinder, in actual practice the operation of the controller and, in particular, the operation of the valve 36 is continuous and variable. As the level of the fluid falls below the cylinder 72, the valve opens more, and as the fluid level rises after contacting the cylinder, the valve increasingly closes until it is fully closed as illustrated in FIG. 3. In most circumstances, depending upon the evaporation rate of the cryogenic fluid, the valve 36 will normally operate between the two conditions shown in FIGS. 2 and 3, and will seldom be either fully open or fully closed.

An important aspect of the present invention is the cylinder 72 and the material from which it is manufactured. It is desired that the cylinder 72 expand when the cylinder is not in contact with the cryogenic fluid (the condition of the cylinder 72 illustrated in FIG. 2), and thus the material most suited would be one with a relatively high thermal coefficient of expansion which will expand sufficiently to cause the level 80 to move in the direction of angular arrow 90 and open the valve 36. One material with the desired characteristics would be polytetrafluoroethylene (sold under the trademark TEFLON). Such material not only has the desired high coefficient of thermal expansion, but also does not become brittle when subjected to a very low temperature, as would be the case when the cylinder 72 is submerged in the cryogenic fluid 16. However, other thermosetting plastics, such as polyamine, would have somewhat similar characteristics. The most important characteristic is the coefficient of thermal expansion, which should be relatively high (greater than approximately 0.03 for the coefficient of linear thermal expansion).

Even though the expansion of the cylinder 72 is needed in order to open the valve 36, it should be appreciated that the actual longitudinal displacement of the cylinder to the left as viewed in FIG. 2 is relatively slight. The location of the pivot point for the lever 80 (as determined by the location of pin 82) will result in a greater displacement of the end 88 of the lever and the resulting displacement of the valve ball 50 in order to open the valve 36.

It can thus be seen that there has been provided by the present invention a fluid controller that is particularly well suited for a cryogenic container, that is simple in design and is inexpensive to manufacture.

Although the presently preferred embodiment of the invention has been described, it will be understood that various changes may be made within the scope of the appended claims.

What is claimed is:

1. A fluid level controller for maintaining at a predetermined level the cryogenic fluid provided to a container by a cryogenic fluid supply, said controller comprising:

a valve disposed between the container and the supply for controlling the flow of fluid from the supply to the container, said valve having a first open position wherein fluid is free to flow from the supply to the container and a second closed position wherein fluid is not permitted to flow from the supply to the container;

a thermal expansion member disposed entirely within said container for being in direct contact with the fluid in the container when the fluid is at or above the predetermined level, and for being out of contact with the fluid when the fluid is below the predetermined level, said thermal expansion member cooled by the fluid and having a smaller physical dimension when in contact with the fluid; and valve actuating means coupled to said thermal expansion member for moving said valve from one of the first and second positions to the other of the first and second positions when said thermal expansion member comes into contact with the fluid in the container at least a portion of said valve actuating means being disposed within said container and adjacent to said thermal expansion member.

2. A fluid level controller for maintaining the level of cryogenic fluid in a container close to a predetermined level, said controller comprising:

an inlet through which the fluid enters the container from a supply of the fluid;

a valve disposed between the inlet and the supply for controlling the flow of fluid from the supply to the container, said valve operable between a first open position wherein fluid is free to flow from the supply to the container and a second closed position wherein fluid is not permitted to flow from the supply to the container; and a thermal expansion element disposed entirely within said container for being in direct contact with the fluid in the container when the fluid is at or above the predetermined level, and for being out of contact with the fluid when the fluid is below the predetermined level, said thermal expansion element having a relatively high coefficient of thermal expansion and valve actuating means coupling said thermal expansion element to said valve so that said valve is moved from said first position toward said second position when the fluid comes into contact with and cools said thermal expansion element and so that said valve is moved from said second position toward said first position when the fluid goes out of contact with said thermal expansion element, at least a portion of said valve actuating means being disposed within said container and adjacent to said thermal expansion element.

3. The fluid level controller of claim 2 wherein said thermal expansion element is a cylinder with a heating element disposed in the interior of said cylinder so that said thermal expansion element is heated for more rapid expansion when not in contact with the fluid.

4. The fluid level controller of claim 2, wherein the thermal expansion element is made of polytetrafluoroethylene.

5. The fluid level controller of claim 2, further comprising:

a frame on which said thermal expansion element is mounted; and wherein said valve actuating means comprises:

a lever pivotally mounted on said frame, said lever having one end proximate to said thermal expansion element and a second end proximate to said valve, so that as said thermal expansion element expands said thermal expansion element bears against said one end of said lever and causes said lever to pivot and said second end of said lever to bear against said valve.

6. The fluid level controller of claim 5, wherein said thermal expansion element, said valve and said inlet are all disposed in the container.

7. The fluid level container of claim 5, wherein said valve comprises;

a valve body formed in said frame, said valve body including a valve passage with a seat;

a ball which is spring-biased into engagement with said seat, said valve being in the first open position when the ball is away from said seat and in the second closed position when the ball engages said seat; and a stem supported in said frame for sliding movement and having one end proximate said lever and another end proximate said ball so that when said thermal expansion element expands and causes said lever to pivot, said stem bears against the spring-biasing of said ball and moves said valve to the first open position.

8. A fluid level controller for controlling the level of cryogenic fluid in a container used for cooling an electronic device to very low temperatures, so that the fluid level is maintained close to a predetermined level above the electronic device, the fluid level controller comprising:

a frame;

a thermal expansion cylinder mounted on said frame and having a heating element disposed in its interior, said cylinder located on said frame so that said cylinder is in contact with the cryogenic fluid when the fluid is at the predetermined level, said cylinder contracting when in contact with the fluid and expanding when out of contact with the fluid;

a valve formed in said frame, said valve having a first open position and a second closed position, said valve further having a valve ball, valve seat, and valve actuating stem, said valve actuating stem for moving the valve ball into a sealing relationship with said valve seat so that said valve may be changed between its first and second positions; and a lever pivotally mounted on said frame, said lever having one end proximate to said cylinder and a second end proximate to said valve actuating stem, so that upon expansion of said cylinder said lever and said valve actuating stem move said valve to its first position and upon contracting of said cylinder said lever and said valve actuating stem move said valve to its second position said frame supporting said thermal expansion cylinder, said valve and said lever as single unit disposed within said container and being completely immersed within the cryogeric fluid.

9. The fluid level controller of claim 8, wherein said lever is pivotally mounted on said frame by a pin, said pin located closer to said one end of said lever than the other end of said lever.

10. The fluid level controller of claim 9, wherein said cylinder is made from polytetrafluorethylene.

11. The fluid level controller of claim 1, wherein said thermal expansion member, said valve and said valve actuating means supported as a single unit within said container and being completely immersed within the cryogenic fluid.

12. The fluid level controller level controller of claim 2, wherein said thermal expansion element, said valve and said valve actuating means supported as a single unit within said container and being completely immersed within the cryogenic fluid.

* * * * *